Dec. 2, 1969            KOICHIRO SAIKI          3,481,267
COMBINED GRILL AND SKEWER FIXTURE
Filed June 20, 1968
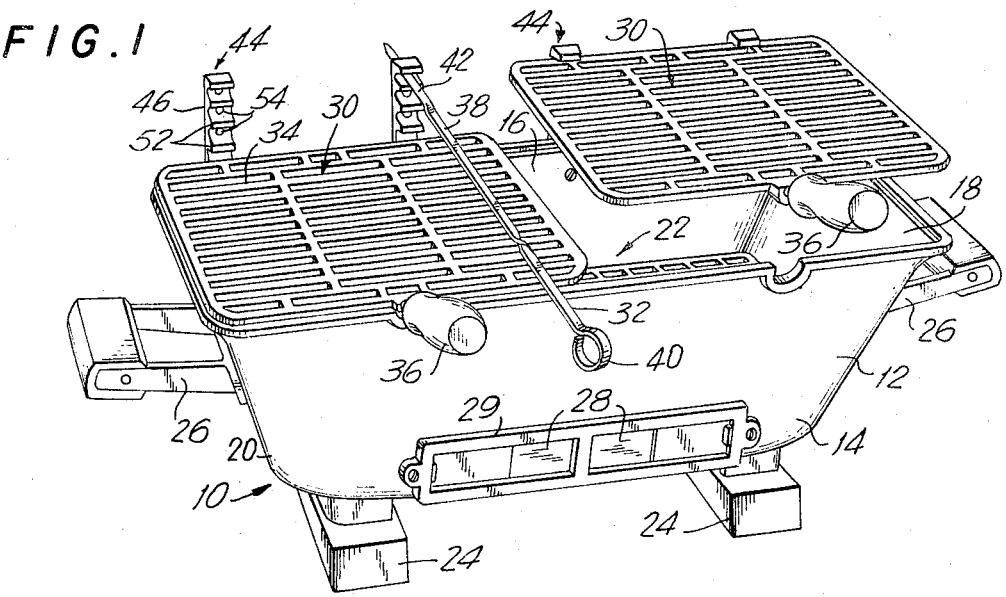
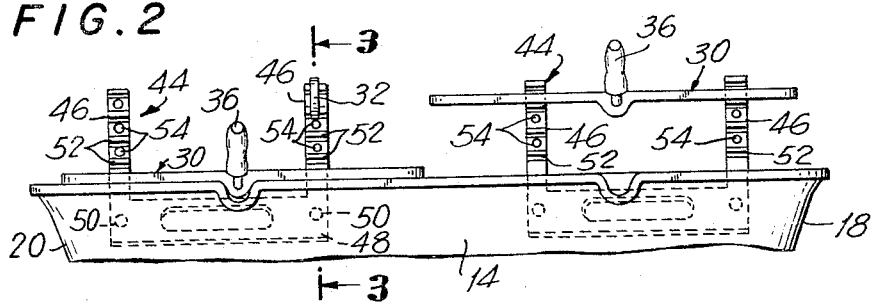
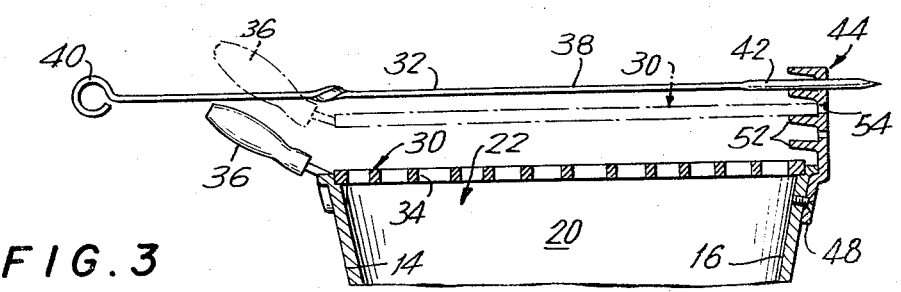
INVENTOR.
KOICHIRO SAIKI
BY
*Amster & Rothstein*
ATTORNEYS

United States Patent Office 3,481,267
Patented Dec. 2, 1969

3,481,267
COMBINED GRILL AND SKEWER FIXTURE
Koichiro Saiki, Yokkaichi, Japan, assignor to Saiki Chuzosho, Suzuka, Japan, and NMS Industries, Inc., New York, N.Y.
Filed June 20, 1968, Ser. No. 738,621
Claims priority, application Japan, Sept. 25, 1967, 42/81,692
Int. Cl. A47j *37/07*
U.S. Cl. 99—339                    7 Claims

ABSTRACT OF THE DISCLOSURE

A fixture which is to be attached to the wall of a charcoal cooking unit. The fixture includes a vertical stand with numerous teeth and apertures formed between the teeth. A grill may be held at a desired height wedged between any pair of teeth and a skewer can be held at a desired height by its end being placed in an aperture.

---

This invention relates to a combined grill and skewer fixture for use with cooking units.

The use of charcoal cooking units for the purpose of roasting meats, vegetables, fowl and other foods above burning charcoal is well known. However, the intensity of the heat emitted by the charcoal is difficult to regulate, and it is thus conventional for purposes of regulation to move the food either closer to the burning charcoal or further away from it, depending upon the intensity of the heat emanating from the burning charcoal and also depending upon the desired cooking heat to be applied to the food. Further, charcoal cooking has been traditionally carried out in one of two ways. Either the food has been laid on a grill which is especially well adapted to hold large and bulky foods such as pieces of steak, chicken, corn and the like. When such a grill was utilized, some means was provided to move the grill either closer to or further away from the burning charcoal as was necessary. The other way of traditionally cooking foods was to place the foods on an elongated skewer. Such a skewer was particularly desirable for foods of a smaller bulk such as pieces of cubed steak, tomato quarters, pieces of vegetables such as cubed carrots, diced peppers, and the like. When such a skewer was utilized, there also was provided some means for placing the skewer at various distances from the burning charcoal.

The primary object of the present invention is to provide a fixture for use with a charcoal cooking unit which hold both a grill and a skewer, either jointly or individually, and is capable of retaining both the grill and the skewer at any desired distance from the burning charcoal.

It is another object of the present invention to provide a fixture of the character descirbed which accepts the grill and the skewer to hold the same in place quickly and easily, and releases these units in a similar manner.

It is still a further object of the present invention to provide a fixture of the character described which is simple in construction and low in cost, which is easy to maintain and which carries out its function in a simple and efficient manner.

In general, the present invention relates to a fixture which is to be attached to the wall of a charcoal cooking unit. Such units traditionally have four walls which define a charcoal well, and are utilized in connection with one or two grills and any number of skewers.

The fixture includes a plurality of vertical stands which at their lower ends are attached to one of the walls of the cooking unit. The stands carry numerous tapered teeth vertically spaced along them, the upper and lower opposing faces of the teeth being adapted to hold one edge of a grill. The teeth are tapered inwardly so as to project over the well.

The stand further includes a number of apertures formed therein, each aperture being formed centrally between each pair of teeth. The apertures receive the tips of the skewer and hold the skewers so placed over the unit. Accordingly, a grill may be stationed at a desired height by being placed between any pair of teeth on a stand. Further, a skewer may be held in a desired location by having its end placed into an aperture in the stand, thereby being held at a desired distance from the charcoal fire.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a charcoal burning cooking unit having a pair of fixtures of the present invention mounted thereon;

FIG. 2 is a fragmentary side elevational view of the cooking unit with its fixtures; and FIG. 3 is a fragmentary cross sectional view taken substantially along the line 3—3 of FIG. 2.

There is illustrated in the drawings, a conventional cooking unit of the type intended to burn charcoal and to cook various foods such as meat, fish, poultry and vegetables by charcoal broiling. The unit 10 includes a heavy cast iron body 12 which is made up of a pair of opposed generally parallel side walls 14, 16 and a pair of opposed generally parallel end walls 18, 20. The side walls 14, 16 and the end walls 18, 20 taper upwardly and outwardly, and with the floor of the body 12, define a well 22 within which charcoal to be burned is placed. The body 12 rests on a pair of elongated feet 24 and the body is carried by a pair of opposed handles 26. The body 12 includes the pair of slidable vents 28 mounted in a frame 29 in its lower portion through which the flow of air into the well may be adjusted and from which ashes may be removed.

The cooking unit 10 is utilized with one or more grills 30, and one or more skewers 32. Each grill 30 is essentially rectangular in plan and includes a number of intersecting ribs 34. A handle 36 is fixed to one edge of each grill 30 by means of which the grill may be shifted in position.

Each skewer 32 includes an elongated shaft 38, one end of which is formed into a bight 40 and the other end of which is formed into a generally cylindrical tip portion 42.

The invention of the present application relates to a fixture to be used with the conventional cooking unit just described. The fixture is for the purpose of holding either a girll 30 of a skewer 32 or both at any desired distance above the charcoal burning in the well 22.

In the embodiment shown in the drawings, a fixture 44 is provided and each fixture 44 desirably comprises a plurality of stands 46. As will be seen, one fixture 44 is provided in connection with each grill 30, so that if the cooking unit includes two grills as shown in the drawings, there will be two fixtures 44.

Each stand 46 is an elongated upright member and the two stands 46 of each fixture are joined and spaced apart by a horizontal elongated bar 48. As will be seen in FIG. 3, the bar 48 has its front face sloped to match the taper of the side wall 16.

Means are provided to attach each fixture 44 to a side wall of the body 12. For this purpose, each bar 48 has a pair of spaced apertures 50 formed therein, each aperture being in vertical alignment with one of the stands 46. A screw passes through this aperture 50 and into the side wall to firmly attach the fixture to the cooking unit (see FIG. 3). The aforesaid attachment of the fixture 44 to the side wall 16 of the cooking unit 10 holds the stands 46 vertically and erectly upright, at one edge of the body 12.

Each stand 46 has a number of teeth 52 formed thereon in vertical array, each of the teeth being of identical configuration. The teeth taper from a thickened portion at the location at which they join the stand 46 to a thinner portion distant from the stand 46, and the teeth project inwardly over the well 22. Further, the teeth on one stand 46 are in horizontal alignment with the teeth on the other stand, when the fixture is attached to the cooking unit 10 (see FIG. 2).

It should be noted that both the upper and lower faces of each tooth slope upwardly, the lower surfaces of the teeth sloping upwardly at a more severe angle than the upper faces of the teeth.

Each stand 48 has formed therein a plurality of apertures 54, there being an aperture formed between each pair of teeth 52. Each aperture 54 passes through the body of the stand 46. It will of course be evident that the apertures are formed in both the stands 46 of each fixture 44.

In use, the edge of a grill 30 opposed to the handle 36 may be placed between horizontally aligned pairs of teeth in the stands 46. The grill 30 is retained in its desired position by a wedging action, that is, by the edge of the grill being caught between the lower surface of one tooth and the upper surface of the tooth immediately below it. As can be seen, the grill can be retained at any desired height with respect to the fixture 44 and is thus adjustable at any desired distance from the charcoal within the well 22.

The apertures 50 are of a size to receive the tip portion 42 of a skewer 32. The skewer can be located at any desired height above the well 22 by placing the tip portion 42 into one of the apertures 54 and the insertion therein of the tip portion will retain the skewer in place.

As seen in FIG. 1, the fixture may hold a grill 30 at any desired height and simultaneously hold a skewer 32 at any desired height over the charcoal well 22. The skewer may be held either above or below the grill, as desired.

It will be appreciated that the fixture described in the foregoing application has the capability of holding both a grill and skewer, and holding each of these units separately at any desired distance above the cooking well. Thereby bulky foods can be cooked on the grill while cubed foods can be cooked on the skewer, all simultaneously.

I claim:

1. A fixture for use with a charcoal cooking unit, the cooking unit including walls defining a charcoal well, and utilizing a skewer and a grill, the fixture including an elongated stand, means fixing the stand to a wall of the unit to hold the stand erectly, a plurality of teeth spacedly arranged in vertical array along the stand, each pair of teeth having opposed faces adapted to hold the edge of the grill therebetween so as to retain the grill over the well, the stand having a plurality of spaced apertures formed therein in vertical array, each aperture being adapted to receive a skewer so as to retain the skewer over the well.

2. A fixture as set forth in claim 1 wherein the teeth are evenly spaced along the stand and the apertures are formed between the teeth.

3. A fixture as set forth in claim 2 wherein an aperture is formed between each pair of teeth.

4. A fixture as set forth in claim 1 where there are at least two stands fixed to and spaced apart on the wall so as grip the grill in plural locations.

5. A fixture as set forth in claim 4 wherein the teeth of one stand are in horizontal alignment with the teeth of the other stand.

6. A fixture as set forth in claim 4 wherein a horizontal bar joins the two stands adjacent the wall of the unit.

7. A fixture as set forth in claim 1 wherein the teeth are tapered and project inwardly over the well.

References Cited

UNITED STATES PATENTS 2,868,189  1/1959  Watrous.
3,422,746  1/1969  Sheinker _____ 99—445

WALTER A. SCHEEL, Primary Examiner

ARTHUR O. HENDERSON, Assistant Examiner

U.S. Cl. X.R.
99—340, 393, 421; 126—25